United States Patent [19]

Palatchy

[11] Patent Number: 4,915,418
[45] Date of Patent: Apr. 10, 1990

[54] HINGED PIPE COUPLING

[75] Inventor: Josef Palatchy, Tiberias, Israel

[73] Assignee: Urdan Industries (USA), Inc., Southfield, Mich.

[21] Appl. No.: 354,298

[22] Filed: May 19, 1989

[51] Int. Cl.$^4$ ............................................. F16L 35/00
[52] U.S. Cl. ......................................... 285/24; 285/112; 285/367; 285/411; 24/284
[58] Field of Search ................. 285/112, 24, 373, 419, 285/411, 365, 366, 367, 408, 409, 410; 24/276, 282, 284

[56] References Cited

U.S. PATENT DOCUMENTS

| | | | |
|---|---|---|---|
| 735,989 | 8/1903 | Lippincott | 24/284 |
| 875,019 | 12/1907 | Wahlert | 24/284 |
| 1,093,868 | 4/1914 | Leighty | 285/367 X |
| 1,187,430 | 6/1916 | Kenly | 24/284 X |
| 2,449,795 | 9/1948 | Stillwagon | 285/112 X |
| 3,014,259 | 12/1961 | Joseph | 24/284 |
| 3,464,722 | 9/1969 | Larkin | 285/367 |
| 4,408,788 | 10/1983 | Beukema | 285/112 X |

FOREIGN PATENT DOCUMENTS 1196266 11/1959 France ................................ 285/367

Primary Examiner—Dave W. Arola
Attorney, Agent, or Firm—Harness, Dickey & Pierce

[57] ABSTRACT

A circular pipe coupling for coupling aligned pipe ends is formed of arcuate segments arranged end to end. Each segment has outwardly extending lugs formed on its opposite ends, with the lugs on the adjacent segment ends being interconnected. One of each pair of interconnected lugs is formed with an integral hook, with a corresponding opening for receiving the hook formed on the opposite lug and providing an axle upon which the hook is engaged to form a hinge connection, except that one of the pairs of lugs is connected together by a manually releasable mechanical fastener, such as a bolt. One of the segments may be manually positioned upon the adjacent pipe ends to be coupled, with one or more segments freely dangling downwardly therefrom under the force of gravity, which sections may be manually pivotal upwardly for encircling the pipes and for applying the releasable mechanical fastener.

18 Claims, 2 Drawing Sheets

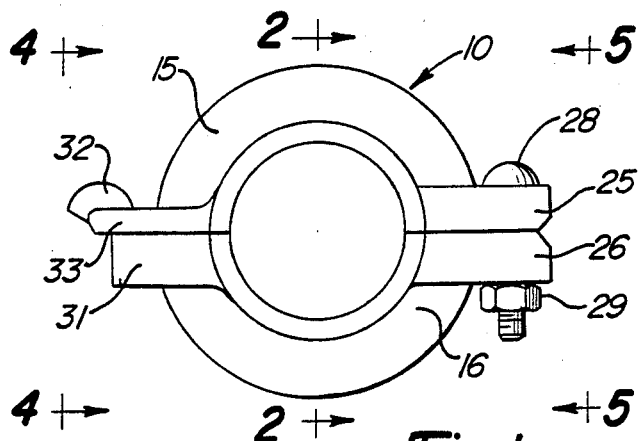
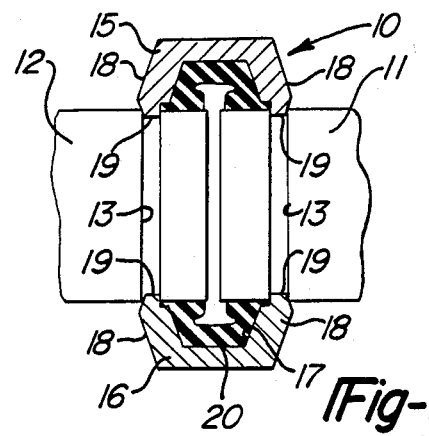
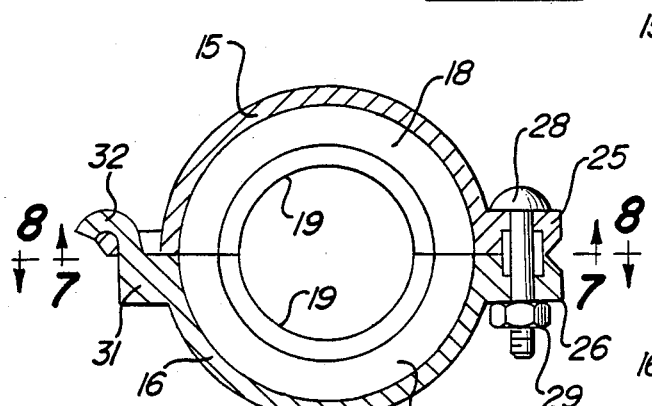
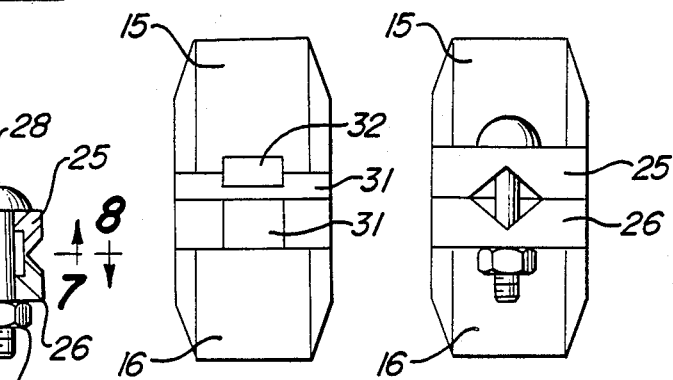
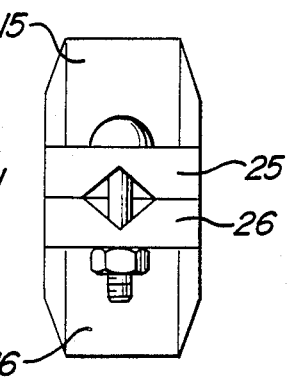
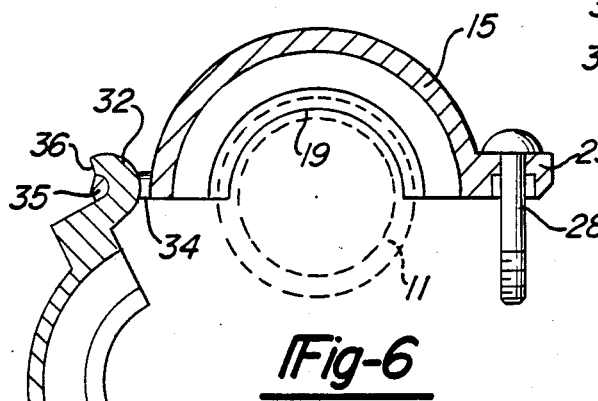
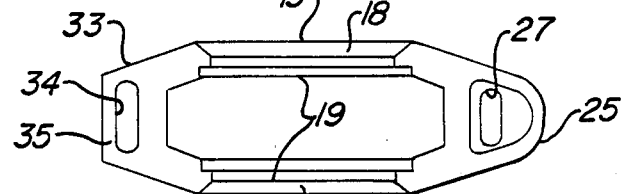
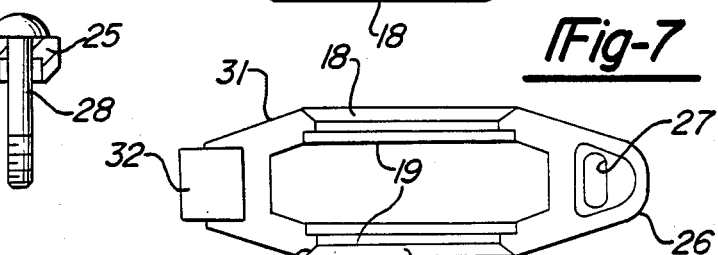
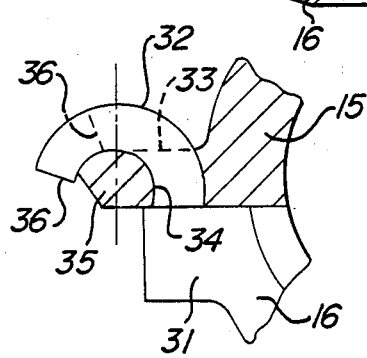

HINGED PIPE COUPLING

BACKGROUND OF INVENTION

This invention relates to an improved pipe coupling of the type which is formed of arcuate segments that provide a circular housing which encircle and connect pipes together. A typical coupling, of the type involved, is formed of a pair of semi-circular segments which have radially outwardly extending lugs formed on their opposite ends. The lugs of one segment overlap and are aligned with the lugs of the adjacent segment. The pairs of overlapped lugs are fastened together with bolts and nuts or the like mechanical fasteners.

The housing formed by the aligned segments is typically U-shaped in cross-section to form a radially inwardly opening, continuous channel. Usually, a rubber-like gasket is inserted within the channel. The gasket encircles and seals against the adjacent edges of the two pipe ends to be connected. The legs of the housing channel may be directly engaged against the pipe surfaces or within grooves formed in the pipe surfaces for fastening the coupling to the pipes.

These couplings are produced by metal casting techniques in various sizes for coupling together different size pipes. Because the couplings are relatively heavy, they are awkward for a plumber to manipulate and to hold in position while coupling pipes together on a job site. Consequently, there have been numerous designs and variations of this type of coupling which have been made with a view towards simplifying the application of the coupling and to more effectively provide a sealed junction or coupling. Nevertheless, there has been a need for couplings which can more easily positioned and held in place by the plumber and, particularly, which permit the plumber to free one hand while holding a coupling and its parts in position upon the pipe ends. Thus, the invention herein relates to such an improved coupling which makes it possible for the plumber to position the coupling and hold it in place with one hand while utilizing the other hand for use in manipulating the pipe ends and the coupling.

SUMMARY OF INVENTION

This invention contemplates a coupling formed of a number of arcuate segments, such as two, three or four segments, which are hingedly connected together, with the exception that adjacent ends of the first and last of the pairs of segments are fastened together with a manually applied mechanical fastener, such as a bolt. Thus, a plumber may position, and hold, a first segment upon a pair of adjacent pipe ends, while permitting the remaining segments to freely dangle beneath the positioned segment ready for application. Thus, one of his hands is free for use in completing the coupling work, such as positioning the necessary sealing gasket or the like. Then, when he is ready the plumber may use his free hand to pivot the dangling segments into their positions around the pipe and to complete the coupling by inserting the bolt through the aligned ends of the first and last segments.

Integral, outwardly extending, lugs are formed on the opposite ends of each of the segments. With the exception of the first and last overlapping lugs, the adjacent overlapping pairs of lugs are interconnected by a curved hook formed on one lug and an opening, which provides a hook receiving axle, formed on the other lug. Where more than two segments are used, the segments form a chain of segments joined together by hook and axle connections, so that the first segment may be manually held on a pipe end while the remaining segments dangle beneath. Each hook and the opening through which each hook extends over the hook axle portion is formed so that the hook is slightly over center, relative to a vertical plane through the axle. Consequently, when its segment is freely dangled under the influence of gravity, the segment is suspended by the hook and axle. However, further pivoting of its segment, to further separate the segments, causes the hook to rotate off its supporting axle so that the hook slides endwise through its opening for completely separating the segments.

One object of this invention is to provide a multi-segment coupling which may be used for coupling large pipes of substantial diameter. For example, the coupling may be formed of four segments, which are hingedly interconnected together so that the plumber may position and hold one segment upon the pipes to be coupled and the remaining segments may simply be hung beneath that one segment in position and ready to be pivoted into coupling connection when the plumber is ready. This simplifies the positioning of the coupling and permits the plumber to have one hand free while utilizing the other hand to hold the coupling in place during the coupling manipulation.

Another object of this invention is to provide an inexpensive coupling construction which may be formed of cast iron or the like segments which may easily and inexpensively manufactured and which reduce the labor required for installation of the coupling upon the ends of the pipes to be coupled.

These and other objects and advantages of this invention will become apparent upon reading the following description, of which the attached drawings form a part.

DESCRIPTION OF DRAWINGS

FIG. 1 is an elevational view of an assembled coupling.

FIG. 2 is a cross-sectional view of the coupling, taken in the direction of arrows 2—2 of FIG. 1, and shows the coupling mounted upon and connecting together the adjacent ends of a pair of pipes.

FIG. 3 is a cross-sectional view of the coupling in assembled position.

FIG. 4 is a side view of the coupling taken in the direction of arrows 4—4 of FIG. 1.

FIG. 5 is a a view of the opposite side of the coupling taken in the direction of arrows 5—5 of FIG. 1.

FIG. 6 is a cross-sectional view of the coupling showing the segments pivoted apart.

FIG. 7 is a bottom view of the upper segment taken in the direction of arrows 7—7 of FIG. 3.

FIG. 8 is a top view, taken in the direction of arrows 8—8 of FIG. 3, of the lower segment.

FIG. 9 is an enlarged, fragmentary view, showing the hinge, hook and axle, construction.

DETAILED DESCRIPTION

Figure 10:
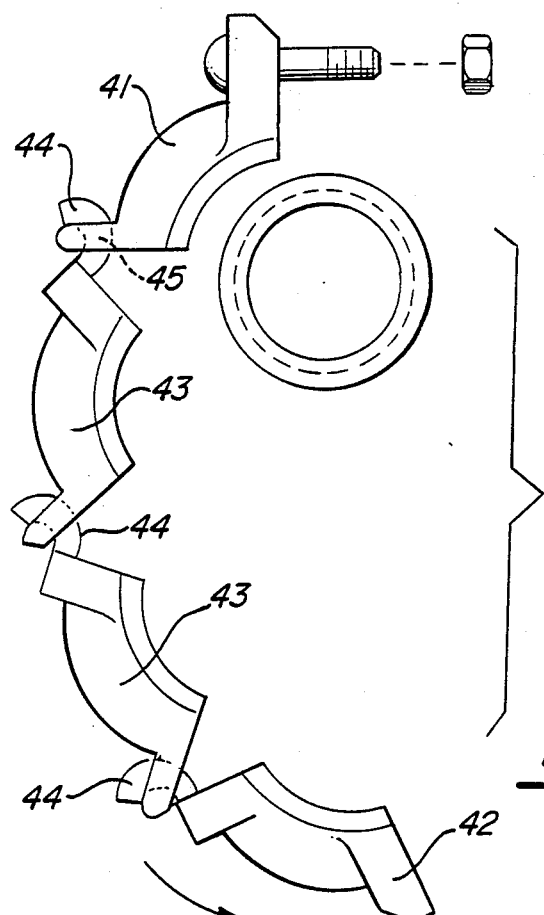
FIG. 10 shows a modified coupling formed of four interconnected segments, with the segments pivoted into open position.

FIG. 2 illustrates the coupling 10 connecting the adjacent ends of a pair of pipes 11 and 12. These pipes are provided with annular grooves 13 for engaging the coupling.

The coupling is formed of an upper, arcuate segment 15 and a lower, arcuate segment 16 which are aligned to form the complete circular coupling housing. These segments are U-shaped in cross-section so as to provide a continuous, annular groove 17 within the housing formed by the aligned segments. The opposite sides or legs 18 which define the continuous grooves 17 are narrowed at their free edges to form annular engagement edges or keys 19 which fit into the surface grooves 13 which they respectively overlap.

In order to seal the joint between the two adjacent pipe ends, a rubber-like gasket 20, which may be U-shaped as illustrated in cross-section in FIG. 2, is inserted within the groove 17 for surrounding the pipe junction and for engaging the ends of the pipes. Thus, the pressure of the fluid passing through the pipes causes tighter sealing of the gasket against the pipes due to the shape of the gasket. This gasket construction is conventional and is described here by way of background.

Each of the segments have radially outwardly extending lugs which are overlapped to form pairs of lugs that are fastened together in order to align and secure the segments to each other. Thus, the upper segment 15 is provided with an outwardly extending lug 25, which may be formed hollow. The opposite, lower segment is provided with a lug 26 which is a mirror image of the lug 25. Thus, the two lugs are overlapped and are engaged together for fastening. For that purpose, each of the lugs are provided with aligned, elongated slot-like, openings 27 (see FIGS. 7 and 8), which receive a bolt 28. The bolt is secured in place by a suitable nut 29 for fixing the lugs 25 and 26 together.

The lower segment 16 has a radially outwardly extending lug 31 formed on its opposite end. This lug is extended to provide a curved hook 32 which is substantially an arc of a circle. The lug 33 extending radially outwardly from the upper segment is provided with an elongated, narrow, hook receiving opening 34 (see FIG. 7). The portion of the lug 33 which is outwardly of the opening 34, that is, which defines the outer edge of the opening 34, forms an axle 35. Preferably, the axle is rounded, at least along the portions engaged by the curved hook 32. The hook is of a rectangular cross-section, which is uniform, so as to substantially fill the opening 34. In addition, the hook is of a sufficient length (see FIG. 9) so that when the lower segment is allowed to freely dangle downwardly under the influence of gravity, while the upper segment is held in a horizontal position around a pipe (as illustrated in FIG. 6), the hook end will still be slightly over center of the vertical center line of the axle 35. This is illustrated in dotted lines in FIG. 9 where the end of the hook is marked with the numeral 36.

In operation, the plumber arranges the upper segment 15, generally horizontally, over the adjacent ends of the pipes, while allowing the lower segment to gravity hang beneath, suspended by the hook and axle. After he aligns the gasket, applies any sealing compounds or the like, and is ready to close the coupling, the plumber may swing the lower segment upwardly and apply the bolt 28. The bolt may be left in place through the lug 25 on the upper segment 15 so that it may be easily slipped into the opening 27 in the lower lug 26 and the nut may be manually applied to hold the lower segment in place. Then, the nut can be tightened with a suitable wrench. Consequently, the plumber may use one hand to hold the coupling in place while the other hand is free to take care of the necessary manipulations and preparations to complete the coupling.

Figure 11:
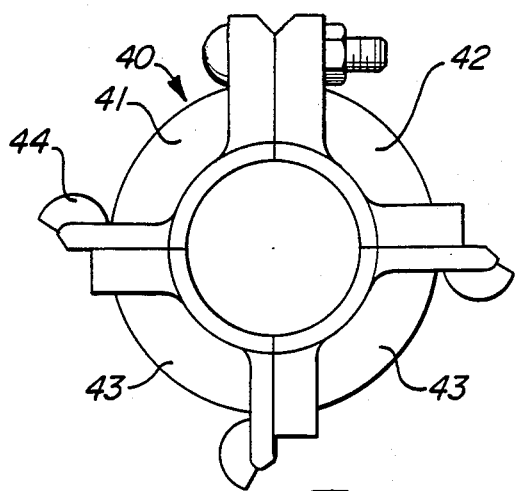
FIG. 11 is an assembled view of the four-segment coupling of FIG. 10.

FIGS. 10 and 11 illustrate a modified form of the coupling 40 which is made of a number of arcuate segments arranged end to end to form the circular coupling housing. Three, four or more segments may be utilized depending upon the size of the pipes to be coupled. This construction permits coupling the ends of very large pipes by using enough segments to make the coupling handleable by a plumber.

FIGS. 10 and 11 illustrate the use of a lead segment 41 which is substantially identical to the previously mentioned upper segment 15 with respect to the opposite lugs, except that the lugs span a 90 degree arc. A final segment 42 is substantially identical to the lower segment 16, except for spanning a 90 degree arc.

Intermediate segments 43 are substantially identical to the previously described segments, with the exception that they each have a hook on one end and a hook receiving opening on their opposite end, similar in construction to that previously described. Consequently, the intermediate segments, along with the final segment, may gravity hang or dangle beneath the lead segment which may be held in place upon the pipes manually by one hand. The segments form a chain hanging beneath the lead segment.

When the plumber is ready to close the coupling, such as after arranging the gasket in place properly and utilizing any desired sealing compounds, he can grasp the final segment in one hand and pull that segment up and around, as illustrated by the arrow in FIG. 10, until its end lug aligns with the end lug of the lead segment. At that time these two lugs can be bolted together in the manner described above.

Figure 12:
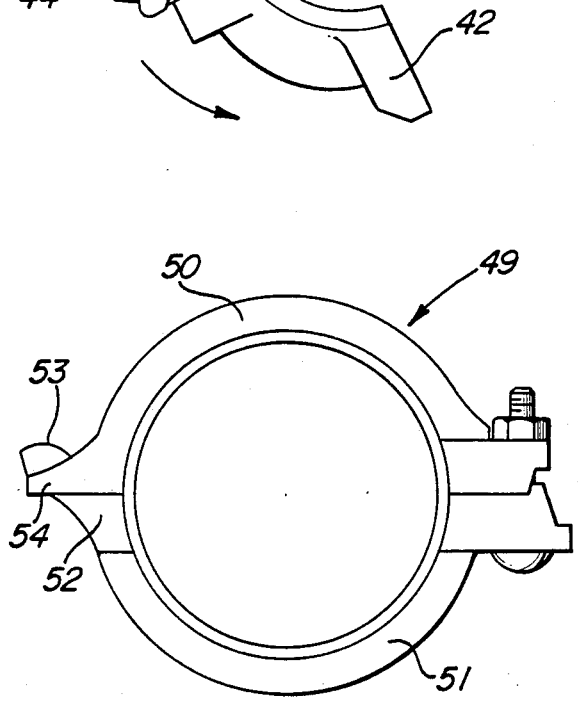
FIG. 12 illustrates a second modification of the coupling.
Figure 13:
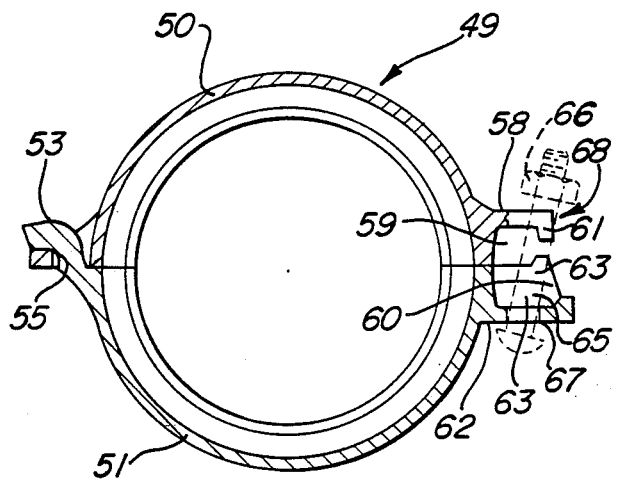
FIG. 13 is a cross-sectional view of the coupling of FIG. 12.

FIGS. 12 and 13 show another modified form of coupling 49 formed with an upper segment 50 and a lower segment 51. These segments are substantially the same as the upper segment 15 and lower segment 16. However, the pairs of lugs are somewhat modified. That is, the hook-lug 52 of the lower segment 51 is somewhat more streamlined or narrowed to reduce the amount of metal required. Its hook 53 extends through the opening 54 in the upper lug 55.

The opposite pair of lugs, that is, the upper lug 56 and the lower lug 57, are U-shaped in cross-section. Thus, the upper lug 56 has a horizontal base 58 and a pair of spaced apart side legs 59 which are notched at their edges to form alignment notches 60. A radially opening slot 61 is formed in the base 58 so that the slot opens radially sideways of the coupling as well as upwardly and downwardly. The radial slot 61 receives the bolt sideways as well as endwise as will be further described.

The base 62 of the lower lug has integral, parallel, spaced apart legs 63, each of which has upwardly extending projections or teeth which closely fit into the respective edge notches 60 of the upper lug legs.

In operation, the upper segment 50 is positioned upon the aligned pipe ends with the lower segment gravity hanging beneath it. A bolt 65, having a nut 66 loosely held within the opening 67 of the lower lug is used to fasten the two lugs together. Thus, when the plumber is ready, he swings the lower segment into alignment with the upper segment, for surrounding the pipes, and manually pushes the bolt sideways as indicated by the dotted arrow 68, until the bolt fits into the radial slot 61. Then, the plumber may tighten the nut manually until the parts are held together, at which point he can release his grasp of the coupling segments and tighten the nut with a wrench for completing the coupling assembly.

This invention may be further developed within the scope of the following attached claims. The foregoing description relates to operative embodiments of this invention. Having fully described at least one operative embodiment of this invention, I now claim:

I claim:

1. A pipe coupling for coupling together the adjacent ends of a pair of axially aligned pipes, comprising:

a substantially circular casing formed of arcuate segments which are aligned end to end along the arc of a circle and which are connected together, with the segments similarly U-shaped in cross-section so as to provide a continuous, inwardly opening, annular channel within the casing, and with the casing channel being generally defined by an annular base and a pair of spaced apart, annular, radially inwardly directed legs whose free, annular inner edges encircle and enclose the adjacent end portions of the aligned pipes;

an annular, resilient gasket positioned within the casing channel for encircling and sealing against the adjacent end portions of the aligned pipes for sealing the coupling joint of the pipes;

each segment having radially outwardly extending lugs formed on each of its opposite ends, with the lugs of each segment arranged to overlap the adjacent lug of its adjacent aligned segment;

hinge-like means for interconnecting at least one pair of the overlapped lugs of each pair of adjacent, aligned segments;

said hinge-like means comprising a hook formed on one of the lugs and an elongated, narrow, enclosed opening formed in the other of the pair of overlapped lugs for receiving the hook, with the opening being elongated in a direction parallel to the casing axis; and with the portion of the free end of the lug defining one elongated edge of the opening forming an elongated axle which is axially parallel to the axis of the coupling, said axle positioned a radial distance away from said casing such that said hook is positioned on said axle between said axle and casing free of contact with said casing;

said hook being of a cross-sectional size to closely fit within the opening and being elongated in width to closely fit within the axially directed width of the opening, so that the hook passes through the enclosed opening, fits over the axle and extends around the axle, and the hook may be pivoted around the axle;

with the segment upon whose lug the hook is formed being pivotally movable downwardly and, therefore, supported by the hook and axle connection while dangling downwardly under the influence of gravity, so that one segment may be manually placed in position around a pipe end portion while its adjacent segment may dangle downwardly therefrom for subsequent manual pivoting around the pipes;

and a manually releasable mechanical fastener interconnecting and locking together at least one pair of adjacent overlapped lugs when the segments are circularly aligned with each other for encircling the adjacent coupled pipe ends.

2. A pipe coupling as defined in claim 1, and with the hook having a curved portion of a length which slightly extends over the vertical axis of the corresponding axle upon which the hook is placed, when the axle is arranged generally horizontally and the segment upon which the hook is formed dangles downwardly under the force of gravity, but so that the hook may be manually further pivoted in a direction where the segments are further pivoted apart, until the hook slips through the opening and clears the axle, so that the hook may be disengaged from the axle for separating the segments when desired, and conversely, the hook may be engaged with the axle by inserting the hook endwise within the opening and relatively pivoting the segments until the hook extends over the axle.

3. A pipe coupling as defined in claim 2, and said hook being of a uniform, rectangular cross-section along its curved length.

4. A pipe coupling as defined in claim 2, and including said mechanical fastener comprising a bolt-type fastener extending through aligned openings in the aligned lugs for manually releasably interconnection thereof.

5. A pipe coupling as defined in claim 4, and including an integral projection formed on one of the mechanically fastened lugs and a corresponding notch formed on the other of the mechanically fastened lugs for interengagement of the projection and slot for alignment of the lugs when fastened together.

6. A pipe coupling as defined in claim 5, and including one of the aligned openings in the mechanically fastened lugs also opening transversely of its respective segment so that the fastener may be manually moved in a generally radial direction, relative to the coupling, for insertion within said opening.

7. A pipe coupling as defined in claim 1, and including at least three segments, with each of the pairs of overlapping lugs of each adjacent pair of segments being connected together by substantially identical hook and axle interconnections, except for one overlapping pair of lugs being connected together by said manually releasable mechanical fastener.

8. A pipe coupling as defined in claim 7, and with each hook having its hook curved portion of a length to slightly extend over the vertical axis of the corresponding axle when the axle is arranged generally horizontally and the segment upon which the hook is formed dangles downwardly under the force of gravity, but with the length extending over the vertical axis being sufficiently short so that further manual pivoting of the segment permits the hook to slide through the opening and clear of the axle so that the hook may be disengaged from the axle for separating the segments and conversely, the hook may be re-engaged with the axle by inserting the hook endwise within its opening and relatively pivoting the segments until the hook extends slightly over the axle.

9. A pipe coupling as defined in claim 1, and including four segments, with each of the pairs of overlapping lugs of each adjacent pair of segments being connected together by substantially identical hook and axle interconnections, with each segment having a hook on one end and an opening with an axle on its opposite end, except for one overlapping pair of lugs which are connected together by said manual releasable mechanical fastener.

10. A pipe coupling as defined in claim 9, and including the curved portions defining each hook being of sufficient length to slightly extend over the vertical axis of the corresponding axle when that axle is arranged generally horizontally, and the segment upon which that hook is formed dangles downwardly under the force of gravity;

whereby the segments may be successively dangled downwardly under the force of gravity while holding one segment against the pipes and the segments may be successively pivoted around their respective hook and axle engagements for encircling the pipe; and whereby the segments may be disconnected from each other by relatively pivoting them apart a distance slightly more than the distance separating them while suspending them under the influence of gravity, so that their respective hooks slide through the opening and clear of the axle to which that hook is engaged, for disengaging the hooks and axles.

11. A pipe coupling for connecting together a pair of pipes, comprising:

a substantially circular casing formed of arcuate segments which are aligned end to end along the arc of the circle and which are connected together at their adjacent ends;

each segment having radially outwardly extending lugs formed on each of its opposite ends, with the lugs of each segment arranged to overlap the adjacent lugs of its adjacent aligned segment;

hinge-like means connecting at least one pair of the overlapped lugs of each pair of adjacent aligned segments;

said hinge-like means comprising a curved hook formed on one of the lugs and an elongated, narrow, enclosed opening formed on the other of the pair of overlapped lugs for receiving the hook, with the portion of the free end of the lug defining one elongated edge of the opening providing an elongated axle which is axially parallel to the axis of the coupling and around which the hook is engaged, said axle positioned a radial distance away from said casing such that said hook is positioned on said axle between said axle and casing free of contact with said casing;

said opening being elongated in a direction parallel to the casing axis, and the hook being shaped, in cross-section, to substantially fill the opening;

with the segment upon whose lug the hook is formed being pivotally movable downwardly and may be supported while dangling downwardly while under the force of gravity, upon its hook and the axle connection, whereby one segment may be manually placed over and positioned about a pipe end portion while its adjacent segment may gravity dangle downwardly therefrom for subsequent manual pivoting around the pipe for coupling purposes;

and a manually releasable mechanical fastener interconnecting and locking together at least one pair of adjacent overlapped lugs when the segments are circularly aligned with each other to encircle the adjacent coupled pipe ends.

12. A pipe coupling as defined in claim 11, and with the curved portion defining said hook being of a length to slightly extend over the vertical axis of its corresponding axle when the axle is arranged substantially horizontally and the segment upon which the hook is formed dangles downwardly under the force of gravity, whereby the hook may be disengaged from its axle by manually further pivoting the segment, upon which the hook is formed, further apart from the segment upon which the opening is formed until the hook slides through the opening and clears the axle.

13. A pipe coupling as defined in claim 12, and including said mechanical fastener comprising a bolt-type fastener extending through aligned openings in its aligned lugs for manually releasable interconnection thereof.

14. A pipe coupling as defined in claim 13, and including at least three segments, with each of the pairs of overlapping lugs of each adjacent pair of segments being connected together by substantially identical hook and axle interconnections, and with each segment having a hook on one end and an opening and axle on its opposite end, except for one overlapping pair of lugs being connected together by said manually releasable mechanical fastener.

15. A pipe coupling as defined in claim 14, and including a projection formed integral on each of one of the pairs of overlapping lugs and a projection receiving socket formed on the other for aligning the lugs.

16. A pipe coupling for coupling together the adjacent ends of a pair of axially aligned pipes, comprising:

a substantially circular casing formed of at least three arcuate segments which are aligned end to end along the arc of a circle which are connected together at their adjacent ends, with each segment being similarly U-shaped in cross-section for providing a continuous inwardly opening annular channel within the casing for receiving an annular, resilient gasket positioned within the casing channel for encircling and sealing against the adjacent end portions of the aligned pipes;

each segment having radially outwardly extending lugs formed on each of its opposite ends, with the lugs of each segment arranged to overlap the adjacent lugs of its adjacent aligned segment;

one of each pair of lugs having an integral curved hook and the other of each pair of overlapped lugs having an elongated, narrow, enclosed opening for receiving the hook for thereby forming a hinge-like connection with the portion of the free end of the lug defining one elongated edge of the opening providing an elongated axle which is axially parallel to the axis of the coupling and around which the hook is engaged, said axle positioned a radial distance away from said casing such that said hook is positioned on said axle between said axle and casing free of contact with said casing, except for one overlapping pair of lugs being formed with aligned openings through which a manually releasable, mechanical fastener is inserted for interconnecting the segments and holding them in circular relationship.

17. A pipe coupling as defined in claim 16, and including each of the curved portions of each of the hooks being of a length to slightly extend over the vertical axis of the corresponding axle upon which that hook is connected when that axle is arranged generally horizontally and the segment upon which the hook is formed is dangled downwardly, under the force of gravity, whereby one of the segments with the mechanical fastener receiving opening in its lug may be manually positioned around the pipe end portions to be coupled and the remaining segments may be dangled downwardly therefrom and then manually pivoted into position around the pipes for interconnecting the segments around the pipes by the mechanical fastener.

18. A pipe coupling as defined in claim 17, and with each of the curved portions of each of the hooks being sufficiently short so that further pivoting of the segments relative to each other to increase their separation, permits the hook to slide through the opening and clear its respective axle for disassembly of the segments from each other.

* * * * *